T. E. MURRAY.
TUBULAR CONNECTION DUCT.
APPLICATION FILED APR. 16, 1913.
1,103,988.
Patented July 21, 1914.
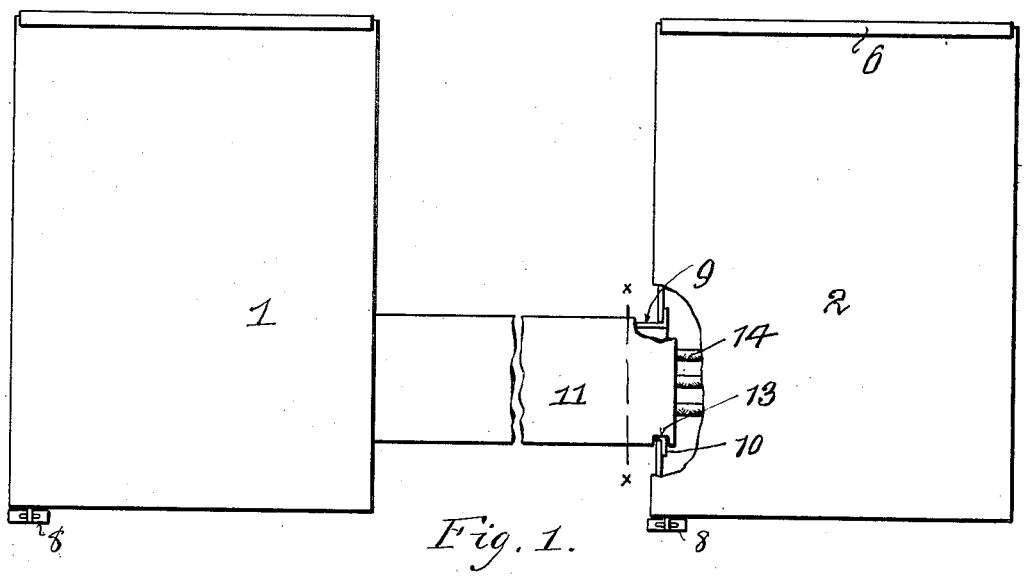
Fig. 1.
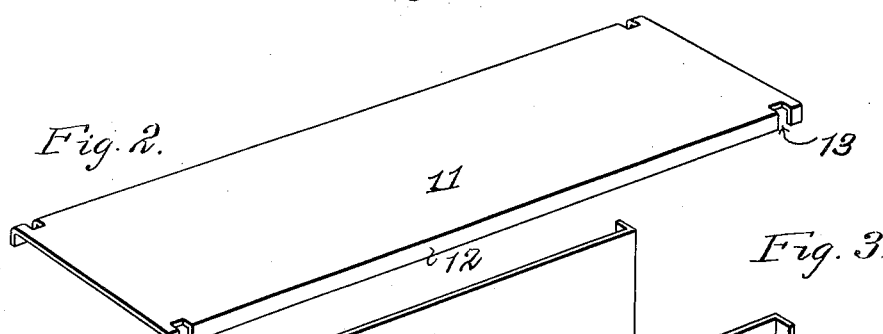
Fig. 2.
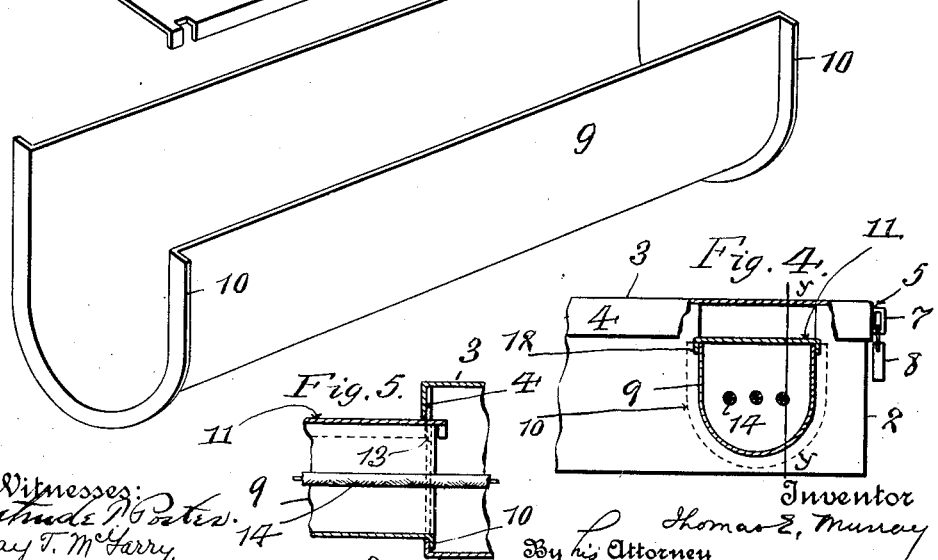
Fig. 3.
Fig. 4.
Fig. 5.
Witnesses:
Inventor
Thomas E. Murray
By his Attorney

UNITED STATES PATENT OFFICE.

THOMAS E. MURRAY, OF NEW YORK, N. Y.

TUBULAR CONNECTION-DUCT.

1,103,988. Specification of Letters Patent. Patented July 21, 1914.

Application filed April 16, 1913. Serial No. 761,423.

*To all whom it may concern:*

Be it known that I, THOMAS E. MURRAY, a citizen of the United States, residing at New York, in the county of New York and State of New York, have invented a certain new and useful Improvement in Tubular Connection-Ducts, of which the following is a specification.

The invention is a tubular connection duct, designed especially for electric line conductors. The duct is made in two parts—a body portion and a cover, and is so constructed that when put in place upon a supporting wall, such as the side wall of a junction box, the said parts become locked together and to said wall.

In the accompanying drawings—Figure 1 is a plan view of my connection duct in place and uniting two junction boxes, a portion of one of the junction boxes being broken away to show the construction of parts. Fig. 2 is the cover of the duct, shown in perspective. Fig. 3 is the body portion of the duct, also in perspective. Fig. 4 is a sectional view on the line $x$, $x$ of Fig. 1 of my connection duct and a part of the junction boxes to which it is joined. Fig. 5 is a sectional view on the line $y$, $y$ of Fig. 4.

Similar numbers of reference indicate like parts.

1 and 2 are sheet metal junction boxes of known construction, each having a recess in the edge of one of its side walls, in which is seated the body portion of the connection duct, in the manner hereinafter described. Each junction box has also a cover 3 with longitudinal flanges 4 and an edge flange 5. When the cover is in place, its unflanged edge passes beneath a ledge 6 on one end wall of the box. In the flange 5 of the cover there is an opening which receives a projection 7 on the box. This projection, after the cover is in place, receives the shackle of a seal fastening 8. By reason of the engagement of the cover with the ledge 6 and the insertion of the seal fastening, as described, the cover can not be removed without first releasing the seal fastening. The junction boxes 1 and 2 and their covers are preferably made of sheet metal.

The tubular connection duct, also preferably of sheet metal, has a body portion 9, preferably of U-shaped cross section, formed with an integral flange 10 at each end. The cover 11 is a flat plate having longitudinal side flanges 12. When said cover is put upon the body portion 9 of the connecting duct, the flanges 10 are received in notches 13 formed in the flanges 10 and cover 11, the flanges 12 then overlapping the side walls of the body portion. The width of the notches 13 is to be greater than the thickness of the flanges 10, for reasons hereafter stated.

In uniting the connection duct to the walls of the junction boxes, the body portion 9 is seated in the recesses in said walls, the shape of these recesses conforming to the cross sectional shape of the duct. The flanges 10 come within the junction boxes. The cover is then placed so that the edges of the box walls bounding said recesses and also the upper edges of the flanges 10 enter said notches 13. The cover then closes the body portion 9 of the connection duct. Preferably the duct occupies the bottom portion of the recess, so that when the covers 3 of the junction boxes 1 and 2 are put in place in the manner already described, the lower edges of the flanges 4 of said covers bear upon the top of the duct cover 11. Finally, the seal fastening 8 is applied to projection 7, thus locking all the parts in place.

The object of the connection duct is to receive circuit wires, indicated at 14, which pass from one junction box to the other. The chief advantage of the construction is its simplicity and cheapness and its ease and security of application. It also avoids the need of cutting and fitting special tubular connections.

I claim:

1. A box having a supporting wall, the said wall having a recess in its edge, a tubular duct, comprising a body portion having an end flange and seated in said recess, and a cover having longitudinal flanges receiving said body portion: the said cover having notches receiving the upper edges of said body flange and the edges of said wall bounding said recess.

2. A box having a supporting wall, the said wall having a recess in its edge, a tubular duct, comprising a body portion having an end flange and seated in said recess, a cover having longitudinal flanges receiving said body portion and notches receiving the upper edges of said body flange and the edges of said wall bounding said recess, and means for locking said cover in place.

3. A box, having a recess in the edge of one of its walls, a cover for said box, means for locking said cover in place, a tubular duct, comprising a body portion having an end flange and seated in said recess, and a cover for said duct having longitudinal flanges receiving said body portion; the said duct cover having notches receiving the upper edges of said body flange and the edges of the box wall bounding said recess.

4. A box, having a recess in the edge of one of its walls, a cover for said box having a downwardly turned flange extending over a portion of said recess, means for locking said cover in place, a tubular duct, comprising a body portion having an end flange and seated in said recess below said cover flange, and a cover for said duct having longitudinal flanges receiving said body portion: the said duct cover having notches receiving the upper edges of said body flange and the edges of the box wall bounding said recess.

In testimony whereof I have affixed my signature in presence of two witnesses.

THOMAS E. MURRAY.

Witnesses:
GERTRUDE T. PORTER,
MAY T. McGARRY.